UNITED STATES PATENT OFFICE.

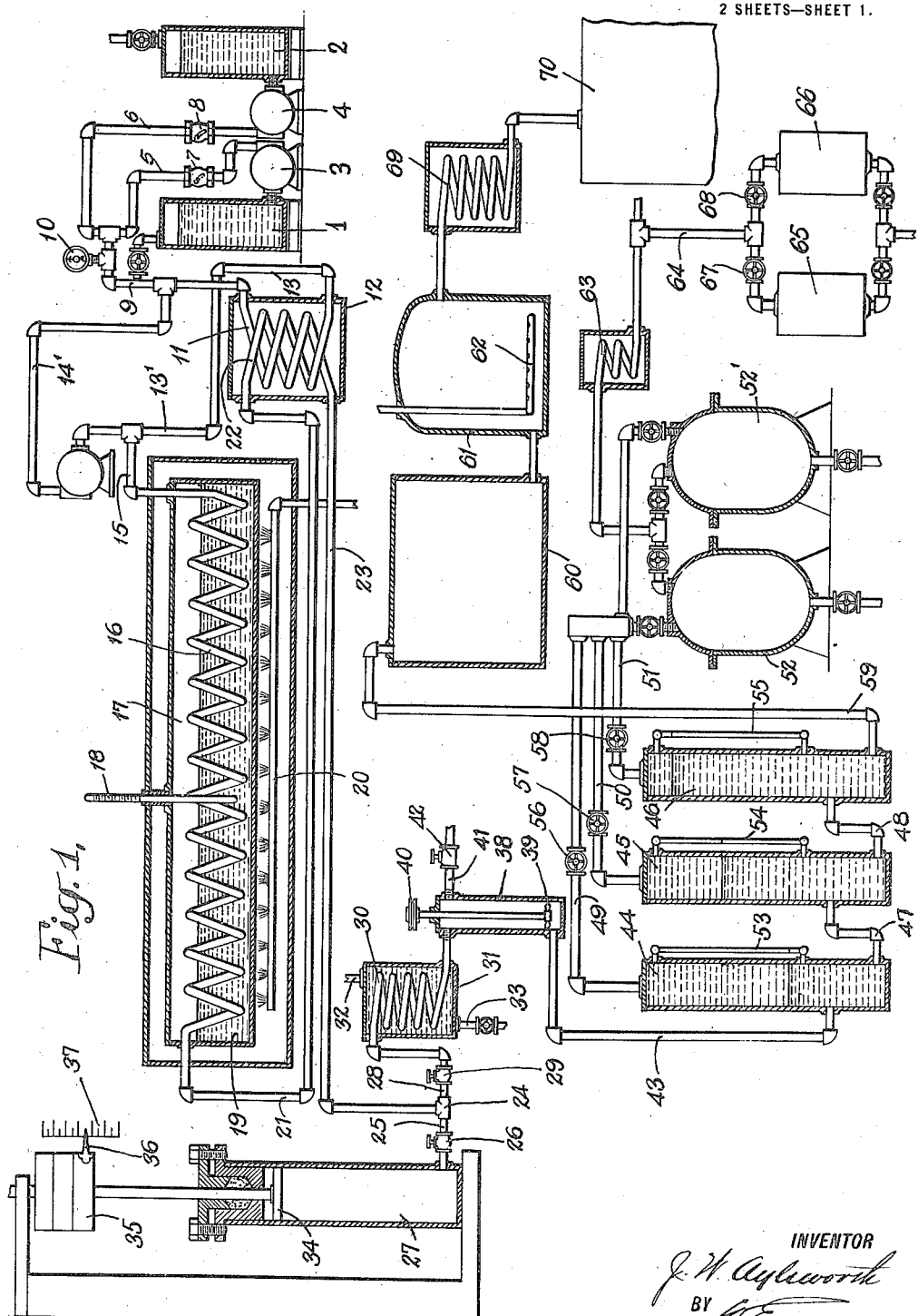

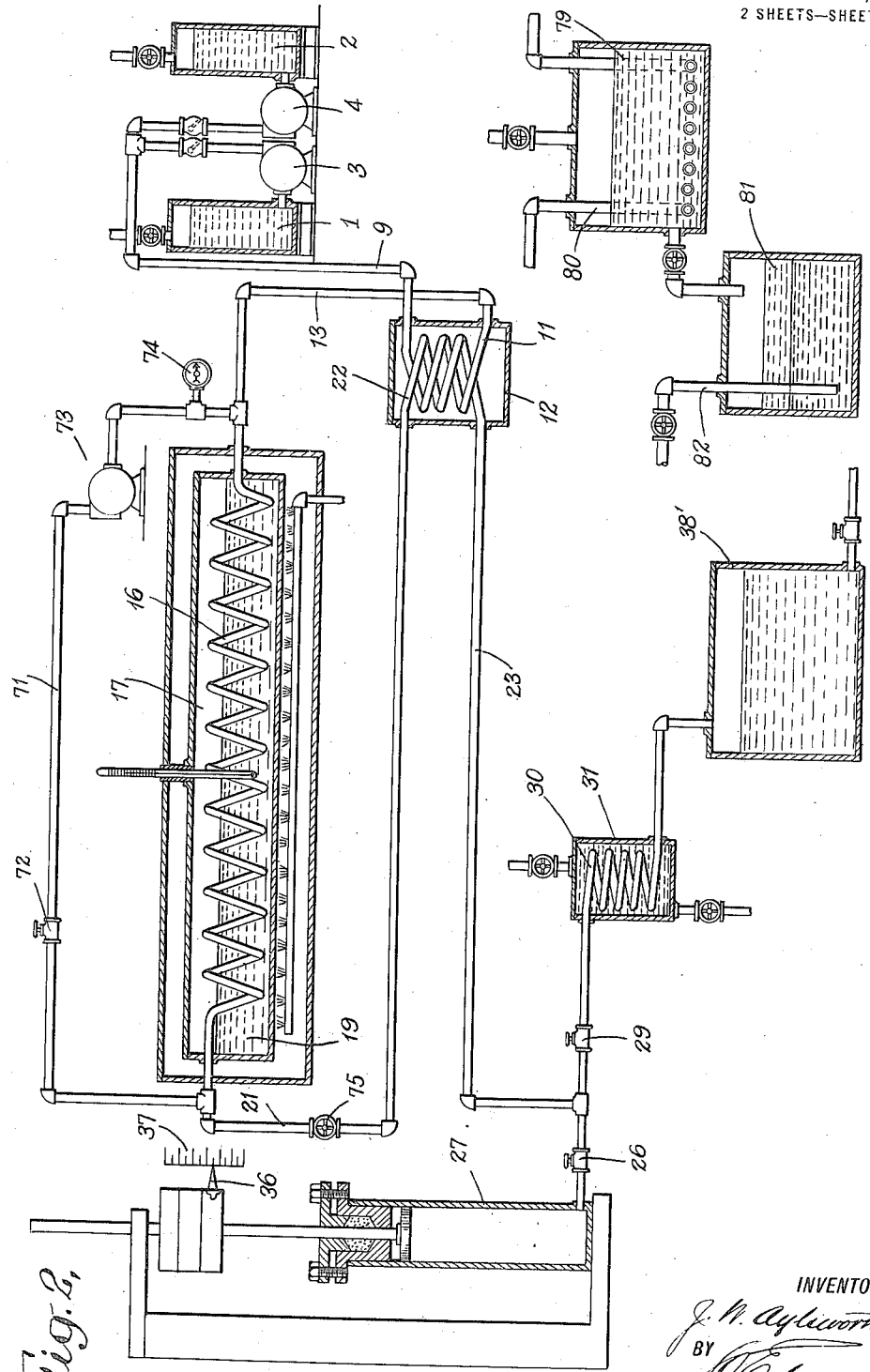

JONAS W. AYLSWORTH, OF EAST ORANGE, NEW JERSEY; ADELAIDE M. AYLSWORTH AND THE SAVINGS INVESTMENT AND TRUST COMPANY, OF EAST ORANGE, EXECUTORS OF SAID JONAS W. AYLSWORTH, DECEASED.

PRODUCTION OF PHENOL AND OTHER SUBSTANCES.

1,213,142.      Specification of Letters Patent.      Patented Jan. 23, 1917.

Application filed January 24, 1916. Serial No. 73,826.

*To all whom it may concern:*

Be it known that I, JONAS W. AYLSWORTH, a citizen of the United States, residing at East Orange, in the county of Essex and State of New Jersey, have invented certain new and useful Improvements in the Production of Phenol and other Substances, of which the following is a specification.

My invention comprises improved processes for producing phenol synthetically from benzene.

My invention also comprises improved methods of producing certain intermediate products in the production of phenol.

My invention also comprises certain steps which are applicable not only to the manufacture of phenol, but also to the production of other substances, such as anilin and naphthols.

My processes are adapted to produce phenol, and other substances, as mentioned above, more efficiently, quickly and cheaply than other processes with which I am familiar. The synthetic product is formed either in a continuous operation or in an intermediate one, as may be desired for different substances and conditions. One of the points of advantage consists in the considerable elimination of waste products, which characterize certain methods now known. Other advantages of my improved process will appear more fully hereafter.

A process for producing phenol, synthetically from benzene, which has long been known and practised on a large scale, consists in first forming benzene sulfonate of soda or potash, and fusing the latter with a large excess of caustic alkali at a temperature of about 300° C. This produces sodium or potassium phenoxid and sodium or potassium sulfite. The phenol is separated from the fused mass by dissolving the latter in water and treating with a suitable acid to neutralize the free alkali and to react with the phenoxid.

The chief drawbacks to the economical production of phenol by this process consist in the waste of acids and alkali used in the production of benzene sulfonate of the alkali, and the expense of the operation of preparing the compound in the pure dry state for the fusion reaction; also the waste of the large excess of caustic alkali required in the fusion reaction, which excess of alkali also requires the consumption of large amounts of acids to liberate or separate the phenol. It is a fact that rather complex processes may be introduced in the various operations to partly recover the waste material. These recovering operations, however, themselves require increased capital and operating expense.

The present process obviates, to a large extent, the necessity of these recovery processes by obviating the necessity of using large excesses of acids and alkalis, as will subsequently be more fully described.

The reaction of producing phenol from benzene by first forming chloro-benzene and then causing it to react with caustic alkali in aqueous solution with the chloro-benzene at a temperature of 300° C., and under the pressure of water vapor at such temperature, has also been described. (See Meyer and Bergius, *Berichte der Deutschen Chemischen Gesellschaft* 47, 3155–3160, 1914). Because, however, of the very high pressure involved, between two thousand and four thousand pounds per square inch, it has not to my knowledge been found practicable to utilize this reaction commercially, the expense of producing and the danger in operating apparatus of this character of sufficient size for commercial production being considerable.

By my process the reaction in which considerable pressure is involved is carried on in steel tubing, which is better adapted to withstand high pressure than the autoclaves involved in prior processes. In my process, I make use of considerably higher temperatures than 300° C., and pressures greater than those due to the vapor tension of the substances involved, since I have discovered that the time required for the completion of the reaction may be greatly shortened by these means.

The initial operation of the process may be practised in either of two ways, the subsequent operations of the process being practically the same in each case. The two methods referred to are sulfonation and halogenation of the benzene.

More broadly described, the first step of the process consists in introducing into the benzene ring, in substitution for one of the hydrogen atoms thereof, an element or group capable of being replaced by the hydroxyl group. In the subsequent operation, the benzene derivative thus formed is caused to react with an alkali hydrate, to cause the formation of phenoxid of the alkali, phenol subsequently being liberated from the phenoxid by treatment with a suitable acid.

Referring to the sulfonation process of performing the initial operation of my method, an excess of benzene with concentrated sulfuric acid is heated at progressively increasing temperatures in a closed apparatus. This may be of cast or wrought iron made strong enough to withstand the pressure of benzene vapors at temperatures up to 130° C. This apparatus is provided with means for rapid stirring. After admission of the acid and benzene, the apparatus is closed and the temperature maintained at about 70° C. during the first two hours, 80° C. during the second two hours, 90° C. during the third two hours, 100° C. during the fourth two hours and 120° C. during the ninth and tenth hours. The mass is then allowed to cool below 70° C. and sulfuric anhydrid is slowly added while stirring, the amount being sufficient to convert the water in the mass to sulfuric acid. The water is formed by the reaction between sulfuric acid and benzene, and limits the reaction by diluting the sulfuric acid to a point where it is no longer effective. After thus strengthening the sulfuric acid, the reaction between the latter and the benzene is continued in the closed vessel by heating for several hours additional at a temperature from the normal boiling point of benzene to 120° C. The addition of sulfuric anhydrid and subsequent heating may be repeated if necessary, and the percentage of free sulfuric acid at the end of the operation will be very small. It is desirable to conduct the heating last mentioned at a temperature above the normal boiling point of benzene, for the reason that the sulfuric acid, weakened by the water of reaction, will combine with much more benzene at such temperatures than is the case when the temperature is at or below that of boiling benzene. By the usual method of forming benzene sulfonic acid in which sulfuric acid is used, the percentage of free acid at the end of the operation is very large, and when sulfuric anhydrid or acid containing $SO_3$ is used to react initially with the benzene, a certain amount of benzene disulfonate is liable to form, and this acts as a wasteful impurity.

The benzene sulfonic acid having been produced, it is dissolved in water in a lead lined tank and converted into its sodium salt by adding sodium sulfite solution, the latter being recovered from the succeeding operations. Or other alkali such as soda ash may be used if desired.

The succeeding operations in this method will be described hereafter. The second method of producing a benzene derivative to be converted into phenol, namely, the halongenation method, will now be described. I prefer this method to the sulfonation process described above, for the reasons, first, that it forms an ideal cycle in which for the greater part, nothing is consumed except benzene, electrical energy and fuel. The necessary agents are regenerated in the process, the latter starting with electrolysis of salt (NaCl.) The second reason for preferring this method is that more concentrated solutions are used, the operations are more rapid and the minimum amount of labor is required, and the phenol is more readily separated or recovered. The electrolysis of salt produces chlorin, hydrogen and caustic soda solution. 2 molecules NaCl solution yield 2 molecules $NaOH+2Cl+2H$. 1 molecule of benzene+2 molecules of chlorin liberated by electrolysis, as stated, makes 1 molecule of chloro-benzene+1 molecule of hydrochloric acid. In the subsequent operations, the chloro-benzene is caused to react with the sodium hydrate formed in the electrolytic operation, to form sodium phenoxid and sodium chlorid. The sodium phenoxid is then caused to react with the hydrochloric acid formed by the electrolysis, to produce phenol and sodium chlorid. The theoretical cycle of the complete operation may therefore be represented as follows:—

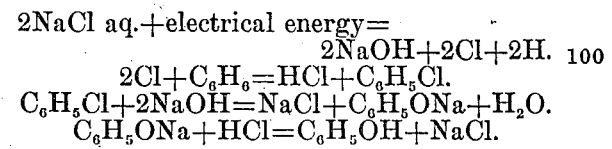

$2NaCl$ aq.+electrical energy=
$\qquad 2NaOH+2Cl+2H$.
$2Cl+C_6H_6=HCl+C_6H_5Cl$.
$C_6H_5Cl+2NaOH=NaCl+C_6H_5ONa+H_2O$.
$C_6H_5ONa+HCl=C_6H_5OH+NaCl$.

It will be noted that the operations described result in a residue of 2 molecules NaCl, the sodium chlorid therefore being regenerated to start the process anew. The hydrogen evolved is utilized as heat in the process and the sodium hydrate and hydrochloric acid produced are utilized in forming the sodium phenoxid and phenol, respectively, in the subsequent operations.

If the initial process results in the formation of an alkali salt of benzene sulfonic acid, as stated, the subsequent operations consist in the addition thereto of sodium hydrate, causing the formation of sodium phenoxid which is then boiled down and decomposed with sulfurous acid. The free phenol, produced either by this means or by the addition of hydrochloric or other acid to the phenoxid formed from the chloro-benzene in the other method, rises to the top of the salt solution from which it may be separated and purified. The salt solution is passed into a boiler and heated while steam is blown through, which concentrates the solution somewhat and removes the last traces of phenol, a part of which is recovered.

The operations subsequent to the formation of the sodium salt of benzene sulfonic acid or of chloro-benzene are preferably carried out continuously, the reaction of the benzene derivative and sodium hydrate being performed, as stated, at a temperature above 300° C., and under pressure greater than that due to the vapor tension of the reacting substances. This involves causing the reacting substances to travel through a path in which they are continuously and uniformly subjected to the desired heat, while at the same time being subjected to pressure. These operations can best be performed in a coil or coils of strong tubing, which passes through a fluid heating bath of the desired temperature.

The preferred apparatus by which the operations referred to are carried out will now be described.

Reference is hereby made to the accompanying drawings forming part of this application and illustrating suitable apparatus for practising the processes described.

In the drawings, Figure 1 represents diagrammatically a series of apparatus for practising the process continuously and Fig. 2 is a similar view of apparatus for practising the process intermittently, parts also being shown particularly adapted for the latter steps of the process of producing phenol from the sodium benzene sulfonate, parts of the apparatus being shown in vertical section and parts in side elevation.

Referring to Fig. 1, a pair of supply chambers 1 and 2 are shown adapted to contain sodium hydrate solution in one and chloro-benzene or sodium benzene sulfonate solution in the other. These solutions are drawn from receptacles 1 and 2 by pumps 3 and 4, respectively, and pass through pipes 5 and 6, provided with check valves 7 and 8, into a pipe 9, the latter being provided with a pressure gage 10. The relative amounts of liquid pumped from vessels 1 and 2 can be regulated, so that the reagents are supplied to pipe 9 in proper proportion. By this means a continuous supply of the reagents in proper ratio to each other is maintained, and vessels 1 and 2 and their respective pumps may each be made of a character suitable for action with the substance operated upon. For example, the pump which operates upon the sodium hydrate solution may be provided with rubber packing, and the other pump may be provided with leather packing, if it operates upon chloro-benzene, whereas neither of these materials would be suitable for packing in case the other material mentioned were used therewith.

The mixed material in pipe 9 flows through a coil 11, in a heating chamber 12, the material thence flowing through a pipe 13, pipe 13', pump 14, and pipe 14', back to pipe 9. The material thus circulates in a closed circuit through the mixing coil 11 and pump 14. The materials are thus thoroughly mixed and are also given preliminary heating, as will be subsequently explained.

Some of the mixed fluid continuously passes out of the closed circuit thus described, by pipe 15, extending from pipe 13' to the reaction coil 16. In operation a substantial amount of material constantly circulates through the mixing circuit described, with a quantity constantly leaving the mixing circuit by pipe 15, at the same rate that fresh material is supplied to the mixing circuit by pumps 3 and 4. The circulating pump 14 should be arranged to cause the mixture to circulate through the mixing circuit at a rate considerably faster than that at which the mixture passes through pipe 15 and reaction coil 16, so that an effective mixing will be had.

Reaction coil 16 is contained in a vessel 17, supplied with a thermometer 18. A bath 19 of fused metal or salt, which will remain fluid at temperatures of 300° C. to 390° C., partly surrounds the convolutions of coil 16, this bath being heated to the desired temperature by a suitable heat supply 20. Coil 16 is sufficiently long for the desired reaction, producing alkali phenoxid, to take place therein.

After reaction, the reacted material passes from the coil by pipe 21, which leads to a heating coil 22, surrounding the mixing coil 11, in chamber 12. The heat of the reacted materials is thus utilized to give a preliminary heating to the mixed material in coil 11 before the latter enters the reaction coil 16.

The reacted material passes from coil 22, by pipe 23, which leads to a T connection 24. From here pipe 25 leads through a valve 26 to a hydraulic accumulator 27. Another pipe 28 leads from T connection 24, through a needle valve 29, to a coil 30 contained in a cooling tank 31, through which cold water may circulate by means of pipe connections 32 and 33.

The hydraulic accumulator 27 is provided with a plunger 34, carrying weights 35, the position of which, and consequently the hydraulic pressure maintained on the system, is indicated by a pointer 36, movable over a scale or dial 37. The pressure in the apparatus will vary between 2000 pounds per square inch and 4000 pounds per square inch, according to the temperature employed, the pressure always, however, being maintained at or above that of the vapor tension of the substances operated upon at the temperature used. The pumping means employed are sufficient to force the liquid through the system at a pressure greater than that of the vapor tension of water at the temperature maintained in the coil, this pressure being indicated by hydraulic gage 10. The needle valve 29 is opened sufficiently to allow a continuous flow into the cooling coil 30 at the same rate at which pumps 3 and 4 supply the liquid to the system, adjustment of valve 29 being regulated in accordance with the position of pointer 36. From the cooling coil 30, the liquid flows into a tank 38, provided with a stirrer 39, which may be rotated by a belt-connection 40, or the like. Acid in amount sufficient to neutralize the solution is introduced into tank 38, through a pipe 41, having a valve 42. From tank 38 the fluid passes by pipe 43, into a series of connected phenol separators 44, 45 and 46, the lower portions of these tanks being connected by connections 47 and 48, and the upper parts of the tanks being connected by pipes 49, 50 and 51, respectively, with the vacuum stills 52, 52', one of which may be used while the other is being cleaned out. The phenol rises above the salt solution in tanks 44, 45 and 46, and is drawn into the vacuum still, control being exercised by the liquid gages 53, 54 and 55, and the valves 56, 57 and 58 in the pipes leading from the tops of the tanks to the vacuum still. The salt solution passes from the last tank 46, through pipe 59, into receiver 60, from which it is fed into a boiler or receptacle 61, containing a perforated steam pipe 62. The salt solution, before boiling, contains between ½ and 2 per cent. of phenol, which is recovered in considerable part by blowing steam through the same by pipe 62. The distillate from still 52 or 52' passes into condenser 63, whence the distilled phenol passes by pipe 64, into receiver 65 or receiver 66, the connections leading to which are provided with valves 67 and 68, so that one receiver may be used, while the other is being cleaned out. The steam with recovered phenol carried thereby passes from boiler 61 through condenser 69 into a receiving tank 70, where the phenol is separated from the water by well-known means.

The apparatus shown in Fig. 2 is adapted for carrying on the same, or a similar process, in an intermittent manner, this figure also showing apparatus used particularly in the last stages of the process of forming phenol from sodium benzene-sulfonate. The mixed reagents supplied by pumps 3 and 4 from tanks 1 and 2 to pipe 9 pass through mixing coil 11 in chamber 12 as before, the liquid passing from coil 11 to pipe 13, which is connected with reaction coil 16 in receptacle 17, which is heated by bath 19 in the same manner as before. The pipe 13 leading into coil 16 and pipe 21 leading out of the same are, however, connected together by a pipe 71 provided with a valve 72. This by-pass connection also includes a pump 73 and a hydraulic pressure gage 74. The pipe 21 leading from coil 16 to the heating coil 22 surrounding coil 11 is provided with a needle valve 75.

When the apparatus is to be used intermittently, valve 75 is closed and valve 72 opened, whereupon the liquid from coil 11 will be circulated by pump 73 repeatedly through coil 16 and pipe 71. This may be continued until the desired reaction is complete, this form of apparatus being intended particularly for use in circumstances in which the coil 16 would have to be of undue length if the reaction were to be carried out entirely in one passage therethrough. Upon the opening of valve 75, the reacted material will pass through coil 22, heating the oil bath in tank 12 as before, the remainder of the system being the same as in the apparatus already described. This apparatus may, of course, be used in a continuous process by closing valve 72. Or the system may operate with valve 72 open and needle valve 75 open just sufficiently to permit a flow therethrough equal to that supplied to the coil 16 by pumps 3 and 4, so that the greater part of the material circulates through a closed path comprising the coil 16 and pipe 71, while a certain amount is constantly passing out of the closed circuit through pipe 21.

Referring now to the process of making phenol from the sodium benzene sulfonate produced by the first method referred to, the solution of the same is brought to a strength of about 23 per cent. and caustic soda is added to an amount equal to about 2 to 2¼ molecules to 1 molecule of the benzene sulfonate of soda. In this case the sodium benzene sulfonate and caustic soda may be mixed and supplied from one of the tanks, such as 1 or 2, by a single pump, such as 3 or 4. Or, the two tanks and two pumps may be used in this case also, with the sulfonate in solution in one and the caustic soda solution in the other. The solutions are preferably passed through the preliminary mixing and heating coil in which they are thoroughly mixed and are given a preliminary heating from the oil bath in chamber 12, which is heated, as stated above, by passing the hot reacted material from coil 16 through coil 22 in chamber 12. The mixture passes from coil 11 through reaction coil 16, in which the reaction takes place, either by passing through one coil sufficiently long to enable the reaction to be carried out, as is shown in Fig. 1, or by passing repeatedly through a similar coil, as is illustrated in Fig. 2. As has been stated, the pumps 3 and 4 are of suitable power to force the liquid through coil 16 at a pressure greater than that of the vapor tension of water at the temperature maintained in the coil, the pressure being equal to or above that of the vapor tension of the reacting substances at the temperature used. The pressure will ordinarily vary between 2,000 pounds per square inch and 4,000 pounds per square inch. This pressure may be determined by hydraulic gage 10, mounted on pipe 19, needle valve 29 being adjusted so that the reacted liquid enters cooling coil 30 at substantially the same rate that the reactive mixture is supplied to coil 16. As stated, valve 29 may be properly adjusted by observation of the position of pointer 36 on the plunger of the hydraulic accumulator 27, since this pointer will rise when valve 29 is not opened sufficiently, and vice versa. The coöperation of the pumps 3 and 4, the hydraulic accumulator and the needle valve 29 insures a continuous flow through coil 16, when the latter is operated in a continuous process, coil 16 at no time having spaces incompletely filled with fluid. A sudden increase of excessive pressure in case valve 29 is opened insufficiently at any time is prevented by the provision of the arrangements described.

The coil 16, which may be made of strong hydraulic steel tubing, is maintained at a temperature of from 300 to 390° C. by means of the bath 19, as stated. A bath of fusible metal or a salt which will remain fluid at the temperatures used is found necessary because of the requirement of even heat in the process, the bath acting as a storage reservoir of heat and supplying the same rapidly to the coil. I have found that hot air and vapor baths are insufficient, since the time required for the relatively cold fluid passing through the coil to reach the temperature necessary for reaction is so long that it requires an abnormal length of coil to perform the reaction. If the air or vapor bath is maintained at a higher temperature than that required within the coil, the system becomes inoperative because of the liquid becoming overheated at times during its transit through the reaction coil.

The fluid is pumped through the reaction coil at such a rate that each portion thereof will be heated continuously for from one to two hours before passing into the cooling coil 30. The following reaction takes place:—

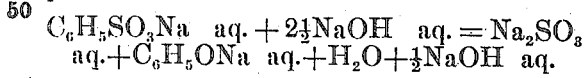
$C_6H_5SO_3Na$ aq. $+ 2\frac{1}{2}NaOH$ aq. $= Na_2SO_3$ aq. $+ C_6H_5ONa$ aq. $+ H_2O + \frac{1}{2}NaOH$ aq.

The advantage of this process over that of fusion is in the non-necessity of the evaporation to dryness of the sodium benzene sulfonate solution, which is necessary when preparing for fusion, and also in the smaller amount of sodium hydrate required to perform the reaction than in the fusion method. In the latter method, 1 molecule of sodium benzene sulfonate requires 4 or more molecules of sodium hydrate to produce the same result obtained in my process by 2 to $2\frac{1}{2}$ molecules.

The concentration of the original mixed solution entering coil 16 is limited by the solubility of the $Na_2SO_3$ formed in the alkaline solution. If the solution is too concentrated, the salt referred to will precipitate in the coils and cause clogging of the pipes and valves.

A very good yield of phenol is obtained with a proportion of 1 molecule of sodium benzene sulfonate to 2 molecules of sodium hydrate, the solution comprising 22.7 parts by weight of the sulfonate to 10.1 parts sodium hydrate and 100 parts of water.

From the cooling coil the liquid mass passes into the tank 38' in Fig. 2, from which it may be removed to an open vessel 79 suitably heated, as by a steam coil 80 therein. Here the solution is boiled down to considerably increase the strength of the same. After this it is allowed to pass into tank 81, into which sulfurous acid or other acid is introduced through pipe 82, the acid decomposing the sodium phenoxid formed in the previous reaction, to form phenol, which separates out above the solution in tank 81, whence it may be removed. The boiling down in tank 79 is necessary, as otherwise the phenol will not separate out perfectly in tank 81. After removal of the phenol, the solution may be evaporated and sold as $Na_2SO_3$, if sulfurous acid is used, a part of the same being used to form benzene sulfonate of soda in the initial operation; in this case the sulfurous acid evolved is recovered for use in the operation of precipitating the phenol from the soda phenate as referred to above. The crude phenol is purified by the usual methods of distillation.

Referring now to the process of producing phenol from chloro-benzene, as has been stated, 1 molecule of the latter may be mixed with 2 molecules of sodium hydrate in accordance with the equation previously given. The two liquids are supplied from tanks 1 and 2 in the same manner already described, passing through coil 11 to and through coil 16 which is heated to a temperature of from 340° C. to 390° C. 1 molecule of sodium phenoxid and 1 molecule of sodium chlorid are formed therein for each molecule of the chloro-benzene. To this is added in tank 38 the 1 molecule of hydrochloric acid previously produced in making the chloro-benzene. The liberated phenol separates from the salt solution nearly completely and rises to the top of the same in separators 44, 45 and 46. As stated above, this phenol is purified by distillation and the salt solution is freed from phenol in boiler 61, after which it may be returned to the electrolytic cells for the repetition of the cycle of operations described, beginning with the electrolysis of the sodium chlorid.

In practice, it is found advisable to have an excess of from $\frac{1}{4}$ to 1 molecule of caustic soda, which requires from $\frac{1}{4}$ to 1 molecule of hydrochloric acid and wastes a corresponding ¼ to 1 molecule of sodium chlorid. The excess of sodium chlorid is preferably used because of the fact that when sodium phenoxid comes in contact with chloro-benzene without the presence of sodium hydrate in excess, various amounts of phenyl ethers are formed, and the latter require a longer time in the presence of sodium hydrate to hydrolize and convert into phenol than would otherwise be necessary. In practical operation, I have found that from ¼ to 1 molecule excess of sodium hydrate is required, so that the proportions may be 1 molecule of chloro-benzene with from 2¼ to 3 molecules of sodium hydrate and 15 to 25 molecules of water. In practice, the chloro-benzene being placed in tank 1, for example, and the sodium hydrate solution in tank 2, pump 3 is so constructed that it will pump, for example, 113 pounds of chloro-benzene during the time that pump 4 is pumping 460 pounds of the caustic soda solution from tank 2.

The provision of the mixing circuit illustrated in Fig. 1, by which a considerable part of the mixed liquids pass rapidly through coil 11 and pipes 13, 13' and 14' is particularly useful in the process in which chloro-benzene is used, since the chloro-benzene and caustic soda solution are not soluble one in the other. The rapid circulation given the same emulsifies the chloro-benzene and the caustic solution, after which the emulsion passes into coil 16 and through the various steps described.

I have found that the reaction between the chloro-benzene and sodium hydrate is best performed, as stated, at temperatures between 340° C. and 390° C. The reaction is complete, at these temperatures, in from fifteen minutes to one hour, whereas it has been stated by previous workers that the reaction should be performed at a temperature of 300° C. for a period of eight hours to obtain a high percentage yield. I have found that if the mass is heated for much longer times than those I have mentioned, at temperatures of 340° C. to 390° C., phenyl ethers and other by-products are formed which reduce the percentage yield of phenol. It would be impossible to perform the reaction I have described in an autoclave, since the time required to bring a large mass to the desired temperature and to again cool the same would inevitably be longer than the time required for best operation. With the coil arrangement described, the time that the reacting fluids are exposed to the temperature of the bath can be evenly regulated for either a few minutes or several hours.

The even heating of the reaction coil is very important, and while this may be accomplished by a bath of a fusible metal, such as lead, or tin, or various alloys, I prefer to form the bath of nitrite of soda. This salt fuses at about 213° C. and may be used at any temperature between 213° C. and 390° C., or even higher, without decomposing. When molten, this material is very thinly fluid, so that uniformity of temperature imparted thereby to the coil by conduction or convection is insured.

To the best of my knowledge, the described use of sodium nitrite as a heating bath has not previously been proposed. Such use was discovered by me as the result of research, it merely being stated by authorities that nitrite of soda melts at 213° C. and decomposes at higher temperatures. I have maintained baths of nitrite of soda at the temperatures used in this process for a number of weeks continuously, without the least evidence of decomposition.

It should be understood that my invention is not limited to the use of the apparatus described, which apparatus I consider to be the best adapted for carrying out certain portions of my novel processes.

Having now particularly described my invention, what I claim and desire to protect by Letters Patent is as follows:—

1. The process of producing phenol, comprising mixing chloro-benzene with caustic alkali solution, causing the mixture to travel through a path in which it is constantly subjected to a temperature in excess of 300° C., under pressure greater than the vapor tension of the reacting substances, at a rate such that each part of the mixture is subjected to the heating for a period of not more than one hour, then adding an acid to liberate phenol from the phenoxid formed, and drawing off the phenol from the solution, substantially as set forth.

2. The process of producing phenol, comprising mixing chloro-benzene with caustic alkali solution and heating the mixture at a temperature considerably above 300° C., under pressure greater than that due to the vapor tension of the reacting substances, to form alkaline phenoxid and chlorid, and liberating and drawing off phenol from the solution, substantially as set forth.

3. The process of producing phenol, comprising mixing chloro-benzene and sodium hydrate in the proportion of substantially one molecule of the former to between two and three molecules of the latter, in aqueous solution, heating the mixture at a temperature considerably above 300° C. under pressure greater than that due to the vapor tension of the reacting substances, to form sodium phenoxid and sodium chlorid, adding hydrochloric acid in suitable proportion to liberate phenol, and separating phenol from the solution, substantially as set forth.

4. The process of producing phenol, comprising mixing chloro-benzene and sodium hydrate in the proportion of one molecule of the former to from two and a quarter to three molecules of the latter, together with water in proportion of from fifteen to twenty-five molecules to one of the chloro-benzene, heating the mixture under pressure to a temperature substantially in excess of 300° C. to form sodium phenoxid and sodium chlorid with sodium hydrate in excess, adding an acid to react with the phenoxid to liberate phenol, and separating out the latter, substantially as set forth.

5. The process of producing phenol, comprising mixing chloro-benzene and alkali hydrate solution, causing the mixture to travel through a path in which it is continuously subjected to a temperature in excess of 300° C., under pressure greater than the vapor tension of the reacting substances, until a phenoxid has been formed, adding an acid to liberate phenol, and drawing off the phenol from the solution, substantially as set forth.

6. The process of producing phenol, comprising mixing together an alkali hydrate solution and a benzene derivative in which is contained, in substitution for one of the hydrogen atoms of the benzene ring, an element or group capable of being exchanged with the hydroxyl group of the alkali hydrate, causing the mixture to travel through a path in which it is continuously subjected to a temperature in excess of 300° C., under pressure greater than the vapor tension of the reacting substances, until a phenoxid has been formed, adding an acid to liberate phenol, and drawing off the phenol from the solution, substantially as set forth.

7. The process of producing phenol, comprising mixing together an alkali hydrate solution and a benzene derivative in which is contained, in substitution for one of the hydrogen atoms of the benzene ring, an element or group capable of being exchanged with the hydroxyl group of the alkali hydrate, heating the mixture at a temperature considerably in excess of 300° C. under pressure greater than that due to the vapor tension of the reacting substances, to form a phenoxid, and liberating and drawing off phenol from the solution, substantially as set forth.

8. The process of producing phenol, comprising mixing together an alkali hydrate solution and a benzene derivative in which is contained, in substitution for one of the hydrogen atoms of the benzene ring, an element or group capable of being exchanged with the hydroxyl group of the alkali hydrate, causing the mixture to travel through a preliminary heating and mixing element, then through a highly heated element, until phenoxid has been formed, causing the reacted fluid to impart heat to the preliminary heating element, and separating phenol from the solution, substantially as set forth.

9. In a process of carrying on an organic chemical reaction at elevated temperatures, involving the passage of the reacting materials through a reaction chamber, the steps of using fused nitrite of soda as a heating bath about the reaction chamber, and supplying heat to the bath to maintain it at a desired temperature between the fusion point of the nitrite of soda and 390° C., substantially as set forth.

10. A process of producing phenol, comprising passing an alkali hydrate solution and a benzene derivative, in which is contained an element or group capable of being replaced by the hydroxyl of the alkali hydrate, through a coil, maintaining the latter at a temperature of not less than 300° C. by means of a bath of a material which will remain fluid at such temperature, about the coil, and thereafter liberating phenol from the reaction product formed in the coil, substantially as set forth.

11. The process of producing phenol, comprising causing an alkali hydrate solution and a benzene derivative, in which is contained an element or group capable of being replaced by the hydroxyl of the alkali hydrate, to mix and rapidly circulate through a continuous closed circuit, drawing off a part of the mixture from the closed circuit, and causing it to react under heat and pressure, while progressing through a path, to form phenoxid, and separating phenol therefrom, substantially as set forth.

12. The process of producing phenol, comprising forcing an alkali hydrate solution and a benzene derivative, in which is contained an element or group capable of being replaced by the hydroxyl of the alkali hydrate, at measured rates, from separate compartments, into a continuous mixing circuit, drawing off part of the circulating mixture continuously and causing it to react under heat and pressure, while progressing through a path, to form phenoxid, and separating phenol therefrom, substantially as set forth.

This specification signed and witnessed this 21st day of January 1916.

JONAS W. AYLSWORTH.

Witnesses:
  DYER SMITH,
  I. McINTOSH.